United States Patent
Nakagawa

(10) Patent No.: US 11,508,083 B2
(45) Date of Patent: Nov. 22, 2022

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Masashi Nakagawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/938,519

(22) Filed: Jul. 24, 2020

(65) Prior Publication Data
US 2021/0035318 A1 Feb. 4, 2021

(30) Foreign Application Priority Data
Jul. 30, 2019 (JP) .............................. JP2019-140124

(51) Int. Cl.
*G06T 7/60* (2017.01)
*G06T 7/73* (2017.01)
*G02B 27/01* (2006.01)
*G06T 7/50* (2017.01)

(52) U.S. Cl.
CPC ............ *G06T 7/60* (2013.01); *G02B 27/0172* (2013.01); *G06T 7/50* (2017.01); *G06T 7/74* (2017.01); *G02B 2027/0138* (2013.01); *G06T 2207/20212* (2013.01)

(58) Field of Classification Search
CPC .... G06T 7/60; G06T 7/74; G06T 7/50; G02B 27/0172
See application file for complete search history.

(56) References Cited

U.S. PATENT DOCUMENTS 5,561,534 A * 10/1996 Ishida .................... G06T 11/40
   358/448
5,579,405 A * 11/1996 Ishida .................... G06T 3/403
   382/199

(Continued)

FOREIGN PATENT DOCUMENTS

JP    2013134706 A    7/2013

OTHER PUBLICATIONS

Leung, T., & Malik, J. (Jun. 1998). Contour continuity in region based image segmentation. In European Conference on Computer Vision (pp. 544-559). Springer, Berlin, Heidelberg.*

(Continued)

*Primary Examiner* — Sarah Lhymn
(74) *Attorney, Agent, or Firm* — Rossi, Kimms & McDowell LLP

(57) ABSTRACT

An image processing apparatus comprises a calculation unit configured to obtain, for a pixel of interest in a boundary portion of a specific region in a captured image bounding a non-specific region, a direction vector to the non-specific region, a selection unit configured to select one of pixels in the boundary portion that are adjacent to the pixel of interest, as a selected pixel based on the direction vector of the pixel of interest, and a generation unit configured to generate information indicating a direction from the pixel of interest to the selected pixel as information indicating a contour corresponding to the specific region.

19 Claims, 10 Drawing Sheets

(56) References Cited

U.S. PATENT DOCUMENTS

| | | | | |
|---|---|---|---|---|
| 5,757,961 | A * | 5/1998 | Yamakawa | G06T 7/12 382/199 |
| 5,778,107 | A * | 7/1998 | Kataoka | G06T 7/74 382/291 |
| 6,356,656 | B1 * | 3/2002 | Kawazome | G06V 10/46 382/199 |
| 6,556,195 | B1 * | 4/2003 | Totsuka | G06T 15/04 345/419 |
| 7,706,610 | B2 * | 4/2010 | Zhang | G06V 10/28 382/199 |
| 8,885,882 | B1 * | 11/2014 | Yin | G06T 7/73 382/103 |
| 9,141,873 | B2 | 9/2015 | Takemoto | |
| 2008/0150949 | A1 * | 6/2008 | Wei | G06T 15/005 345/506 |
| 2011/0229026 | A1 * | 9/2011 | Tsunematsu | G06V 10/457 382/165 |
| 2011/0311133 | A1 * | 12/2011 | Hirota | G06T 7/0012 382/164 |
| 2012/0008860 | A1 * | 1/2012 | Hirota | G06T 7/11 382/165 |
| 2012/0033852 | A1 * | 2/2012 | Kennedy | G06K 9/00 382/103 |
| 2012/0294534 | A1 * | 11/2012 | Watanabe | G06F 30/17 382/195 |
| 2013/0121567 | A1 * | 5/2013 | Hadap | G06V 10/7715 345/426 |
| 2016/0104314 | A1 * | 4/2016 | Nakazato | G06T 7/50 382/285 |
| 2016/0297150 | A1 * | 10/2016 | Ueda | G06T 19/00 |
| 2017/0140534 | A1 * | 5/2017 | Chen | G06T 7/0014 |
| 2018/0262687 | A1 * | 9/2018 | Hildreth | H04N 13/344 |
| 2018/0276835 | A1 * | 9/2018 | Amano | G06T 7/564 |
| 2019/0164354 | A1 * | 5/2019 | Sasaki | H04N 13/128 |
| 2019/0197693 | A1 * | 6/2019 | Zagaynov | G06V 10/243 |
| 2020/0193142 | A1 * | 6/2020 | Huang | G06T 5/005 |

OTHER PUBLICATIONS

Hu, W., Zhou, X., Li, W., Luo, W., Zhang, X., & Maybank, S. (2012). Active contour-based visual tracking by integrating colors, shapes, and motions. IEEE Transactions on Image Processing, 22(5), 1778-1792.*

Yamazaki "Vegetable Identification Using Fourier Descriptor and Color Information" Information Processing Society of Japan Technical Report. 2012: pp. 1-4. English abstract provided. Cited in the specification.

Tatsumi "Hand-Pose Estimation Using P-type Fourier Descriptors for Gesture-based User Interface" The Society of Instrument and Control Engineers, the 283rd Conference. 2013: pp. 1-5. Partial English translation provided. Cited in the specification.

Kass "Snakes: Active Contour Models" International Journal of Computer Vision. 1988: pp. 321-331. Cited in the specification.

* cited by examiner

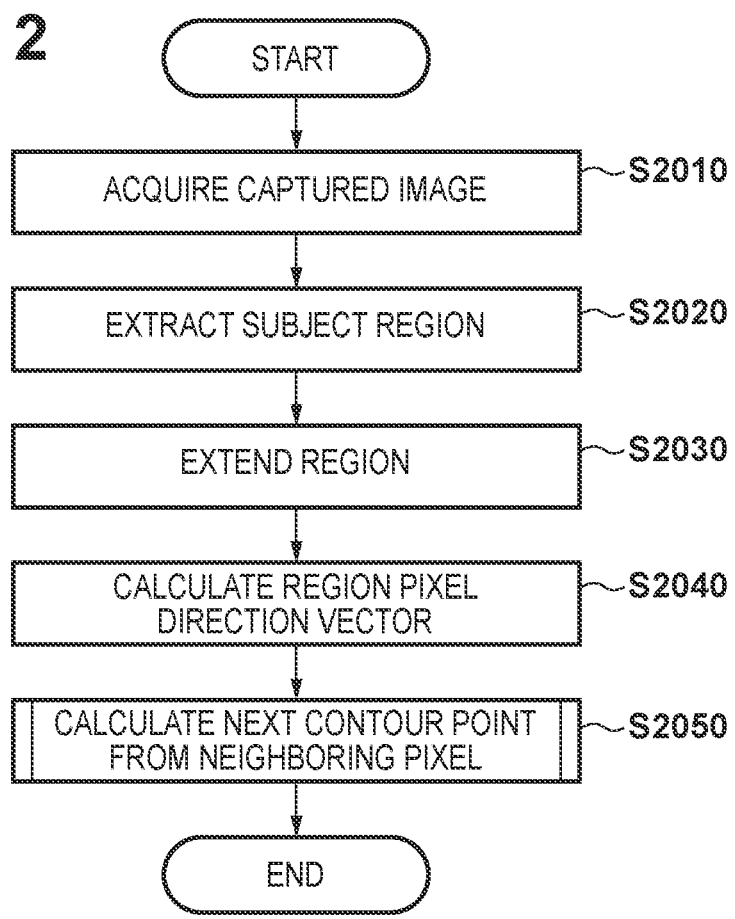
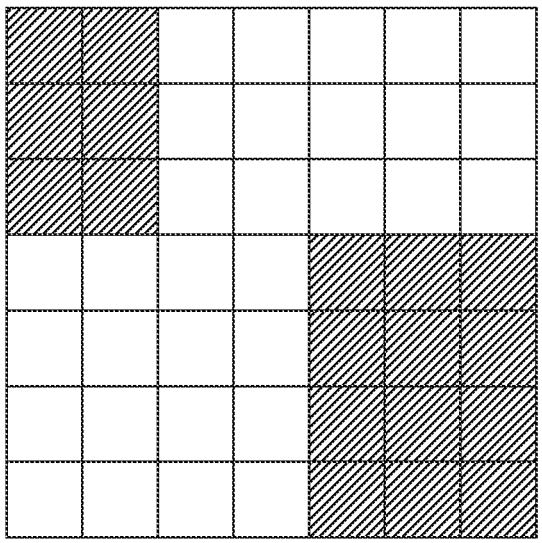
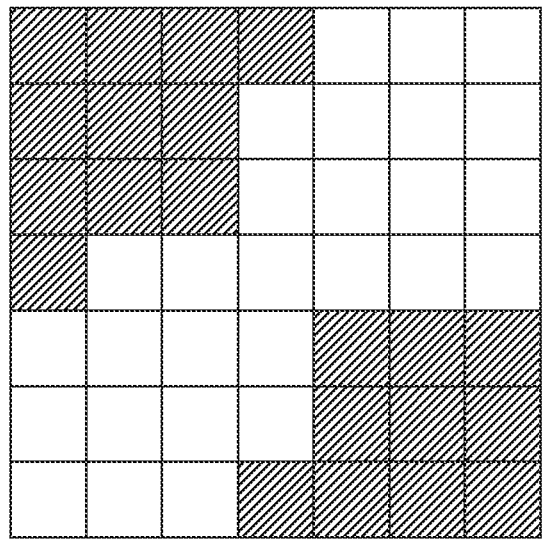

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a contour tracking technology for a subject in an image.

Description of the Related Art

Among many types of image processing, existing contour tracking processing has been used. The contour tracking processing refers to processing executed on results of contour extraction to calculate a next contour point of each contour point. For example, in Taichi Yamazaki, Daisuke Ishii, and Hiroshi Watanabe, "Vegetable Identification Using Fourier Descriptor and Color Information", Information Processing Society of Japan Technical Report, Vol. 2012-AVM-79 No. 27 and Tatsumi, "Hand-Pose Estimation Using P-type Fourier Descriptors for Gesture-based User Interface", The Society of Instrument and Control Engineers, The 283rd Conference, 2013, a target object region is extracted from an image, and contour tracking is performed on the extracted target object region. By using the results of the contour tracking to extract features of the contour based on Fourier descriptors, the shape of the hand or an object can be identified.

In addition, to generate an image with an anteroposterior relationship between a real object and a 3DCG model taken into account, a Mixed Reality (MR) system in Japanese Patent Laid-Open No. 2013-134706 uses contour information regarding an object of interest to perform depth measurement of the real object and generation of the 3DCG model.

Note that, for the contour tracking, sequential processing is typically performed. For example, in typical contour tracking processing, a raster scan is performed on an image resulting from binarization of the target object region, and each time a contour point is found, a chain code is calculated by sequential processing. Additionally, in a dynamic contour method disclosed in Michael Kass, Andrew Witkin, and Demetri Terzopoulos, "Snakes: Active Contour Models", International Journal of Computer Vision, 321-331(1988), an initial contour shape (which may be displaced from a true contour) is initially placed near a target object and is made closer to the true contour by sequential processing. Specifically, an energy function using the length and angle between the contour points is defined, and the contour point is repeatedly moved until the energy function is minimized. As a result, the contour shape and contour tracking information can be obtained simultaneously.

To generate an image with the anteroposterior relationship between the real hand and the 3DCG model taken into account, the MR system in Japanese Patent Laid-Open No. 2013-134706 performs stereo matching utilizing contour information regarding the hand. Specifically, three-dimensional positional measurement of a stable target object is executed by performing stereo matching on the intersection points between an epipolar line and a smoothed contour line resulting from smoothing of contour lines of left and right images.

Note that, in recent years, calculators such as FPGA and GPU have been utilized which are apt at parallel calculation but that the contour tracking processing is typically sequential processing, preventing many calculation cores from being efficiently used. As described in Michael Kass, Andrew Witkin, and Demetri Terzopoulos, "Snakes: Active Contour Models", International Journal of Computer Vision, 321-331 (1988), the dynamic contour method referred to as Snakes involving simultaneous execution of region extraction and contour tracking is suitable for parallel processing but is not particularly suited for real-time processing because the method requires a large number of iterative steps of processing.

Additionally, the dynamic contour method corrects the contour shape to minimize the energy function defined from the parameters of the length and the angle between contour points, and may thus fail to obtain the true contour in a case of a complex uneven shape. For example, in generating a 3DCG model of the real hand, MR uses the contour of the hand to match a real image with the contour of the hand, but in a case where the correct contour is not obtained, the fingers may be connected together and occlusion expression of the area between the fingers may not be correctly provided. Also in the object recognition, a significant change in contour shape due to connecting prevents the correct object recognition.

SUMMARY OF THE INVENTION

The present invention provides a contour tracking technology enabling parallel processing.

According to the first aspect of the present invention, there is provided an image processing apparatus comprising: a calculation unit configured to obtain, for a pixel of interest in a boundary portion of a specific region in a captured image bounding a non-specific region, a direction vector to the non-specific region; a selection unit configured to select one of pixels in the boundary portion that are adjacent to the pixel of interest, as a selected pixel based on the direction vector of the pixel of interest; and a generation unit configured to generate information indicating a direction from the pixel of interest to the selected pixel as information indicating a contour corresponding to the specific region.

According to the second aspect of the present invention, there is provided an image processing method comprising: obtaining, for a pixel of interest in a boundary portion of a specific region in a captured image bounding a non-specific region, a direction vector to the non-specific region; selecting one of pixels in the boundary portion that are adjacent to the pixel of interest, as a selected pixel based on the direction vector of the pixel of interest; and generating information indicating a direction from the pixel of interest to the selected pixel as information indicating a contour corresponding to the specific region.

According to the third aspect of the present invention, there is provided a non-transitory computer-readable storage medium storing a computer program for causing a computer to function as: a calculation unit configured to obtain, for a pixel of interest in a boundary portion of a specific region in a captured image bounding a non-specific region, a direction vector to the non-specific region; a selection unit configured to select one of pixels in the boundary portion that are adjacent to the pixel of interest, as a selected pixel based on the direction vector of the pixel of interest; and a generation unit configured to generate information indicating a direction from the pixel of interest to the selected pixel as information indicating a contour corresponding to the specific region.

Further features of the present invention will become apparent from the following description of exemplary embodiments (with reference to the attached drawings).

BRIEF DESCRIPTION OF THE DRAWINGS

FIG. 2 is a flowchart of processing performed by an image processing apparatus 1000 to generate contour information from a captured image for one frame.

FIGS. 3A and 3B are diagrams illustrating an example of a subject region extracted from a captured image.

DESCRIPTION OF THE EMBODIMENTS

Figure 1:
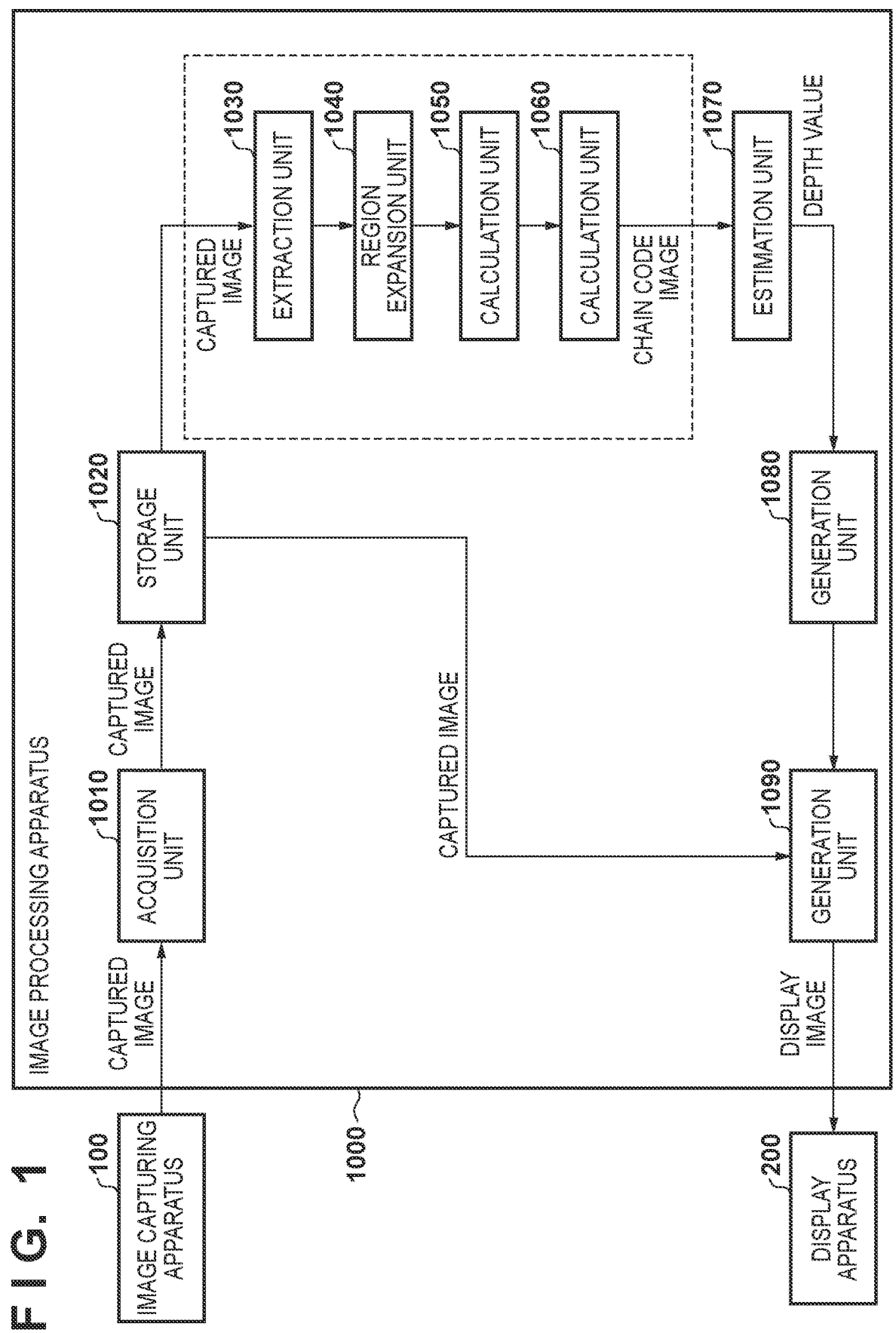
FIG. 1 is a block diagram illustrating an example of a functional configuration of a system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In the following, embodiments will be described in detail, referring to the accompanying drawings. Note that the following embodiments are not intended to limit the invention according to the claims. Although embodiments describe multiple features, all of these multiple features may not be essential for the invention, and the plurality of features may be appropriately combined. Furthermore, in the accompanying drawings, identical or similar components are provided with same reference numerals, with duplicate description being omitted.

First Embodiment

In the present embodiment, a system for providing a user with an image (mixed reality space image) of a mixed reality space in which a reality space and a virtual space are fused together will be described as an example. In this system, a contour of a specific subject such as the hand or body of the user is extracted from a captured image of the reality space, and depth information of the subject is generated from the extracted contour. Then, the system generates a mixed reality space image (a composite image of an image of the virtual space and the captured image) in which the depth information is referenced to express the specific subject and the virtual space based on the correct occlusion expression, and provides the mixed reality space image to the user.

First, an example of a functional configuration of a system according to the present embodiment will be described using a block diagram in FIG. 1. As illustrated in FIG. 1, the system according to the present embodiment includes an image capturing apparatus 100, an image processing apparatus 1000, and a display apparatus 200.

First, the image capturing apparatus 100 will be described. The image capturing apparatus 100 captures a moving image of the reality space, and outputs an image (a captured image) of each frame in the captured moving image to the image processing apparatus 1000.

Now, the display apparatus 200 will be described. The display apparatus 200 displays a mixed reality space image output from the image processing apparatus 1000. In the present embodiment, the image capturing apparatus 100 and the display apparatus 200 are included in a head-mounted display, and the head-mounted display is mounted on the head of the user, who experiences the mixed reality space. However, the apparatus including the image capturing apparatus 100 and the display apparatus 200 is not limited to a head-mounted display, and may be, for example, a smartphone or a handheld display apparatus.

Now, the image processing apparatus 1000 will be described. An acquisition unit 1010 acquires an image (captured image) of each frame output from the image capturing apparatus 100, and stores the acquired captured image in a storage unit 1020.

The storage unit 1020 is a memory apparatus configured to store the captured image acquired by the acquisition unit 1010. Note that the storage unit 1020 further stores data related to the virtual space and information required to extract a region of a subject from the captured image.

The data related to the virtual space includes, for example, data related to each of the virtual objects constituting the virtual space, data related to a light source set in the virtual space, and the like. The data related to the virtual object includes data required to render the virtual object, such as data that defines the geometry of the virtual object and data that defines the color of the virtual object. The data related to the light source includes data specifying, for example, the position and direction of the light source, the color of light, and the like.

An extraction unit 1030 acquires the captured image from the storage unit 1020, and extracts the region of the subject from the acquired captured image using the "information required to extract the region of the subject from the captured image" stored in the storage unit 1020. A region expansion unit 1040 expands (extends) the region of the subject extracted by the extraction unit 1030.

For a pixel of interest in a boundary portion of a subject region resulting from expansion (extension) of the region of the subject extracted by the extraction unit 1030 (in other words, the boundary portion is the contour of the subject region), the boundary portion bounding a non-subject region (region other than the subject region), a calculation unit 1050 determines a direction vector to the non-subject region.

Based on the direction vector of the pixel of interest, a calculation unit 1060 selects one of the pixels in the boundary portion adjacent to the pixel of interest as a selected pixel, and generates information indicating the direction from the pixel of interest to the selected pixel as information (contour information) indicating the contour of the subject region. In the present embodiment, the calculation unit 1060 generates, as contour information, a chain code image in which, for each pixel of interest (contour point), information is registered indicating the position of the selected pixel (contour point next to the above-described contour point) selected for the pixel of interest.

An estimation unit 1070 uses a chain code image generated by the calculation unit 1060 to estimate a depth value corresponding to the pixel of each contour point in the captured image. Various methods may be applied as the method of using the chain code image to estimate the depth value corresponding to the pixel of each contour point in the captured image. For example, the above-described method can be used that is disclosed in Michael Kass, Andrew Witkin, and Eemetri Terzopoulos, "Snakes: Active Contour Models", International Journal of Computer Vision, 321-331(1988).

In a case where polygons are used to form a three-dimensional model corresponding to a region enclosed by a group of contour points specified by the contour information, a generation unit 1080 determines the vertex positions of each of the polygons using the "depth value corresponding to the pixel of each contour point," and camera parameters for the image capturing apparatus 100. For example, the region enclosed by the group of contour points specified by the contour information may be divided into polygons in accordance with constrained Delaunay triangulation, or polygons may be generated, in accordance with a tessellation algorithm as implemented using a graphics card, from the region enclosed by the group of contour points specified by the contour information.

The generation unit 1090 updates a depth buffer at the vertex positions of each polygon of the three-dimensional model determined by the generation unit 1080. Then, the generation unit 1090 generates a mixed reality space by rendering an image of the virtual space on the captured image acquired from the storage unit 1020 while referencing the depth buffer. Thus, the virtual space can be rendered on the captured image based on the correct occlusion expression. Note that the image of the virtual space corresponds to the virtual space as seen from the view point of the user, the virtual space being established based on the data related to the virtual space stored in the storage unit 1020. The position and orientation of the view point of the user may be determined by a known technology using natural features in the captured image, indicators artificially disposed in the reality space, or the like or may be acquired by measurement using a sensor.

Then, the generation unit 1090 outputs the generated mixed reality space image to the display apparatus 200 as a display image. Note that the output destination of the mixed reality space image is not limited to the display apparatus 200 and may be another display apparatus or a client terminal apparatus.

Now, processing performed by the image processing apparatus 1000 to generate contour information from a captured image for one frame will be described in accordance with a flowchart in FIG. 2. The image processing apparatus 1000 performs processing in accordance with the flowchart in FIG. 2, on the captured image for each frame output from the image capturing apparatus 100.

In step S2010, the acquisition unit 1010 acquires the captured image output from the image capturing apparatus 100, and stores the acquired captured image in the storage unit 1020. In step S2020, the extraction unit 1030 acquires the captured image from the storage unit 1020, and extracts the region of the subject from the acquired captured image as the subject region using the "information required to extract the region of the subject from the captured image" stored in the storage unit 1020. A variety of methods for extracting the subject region from the captured image are available, and the present embodiment is not limited to a specific extraction method.

For example, a region of a subject color (color indicated by color information registered in the image processing apparatus 1000 in advance as information indicating the color of the subject) may be extracted as the subject region from the captured image. In this case, the color information indicating the subject color is stored in advance in the storage unit 1020 as the "information required to extract the region of the subject from the captured image", and the extraction unit 1030 uses the color information to extract the subject region from the captured image.

Additionally, for example, the subject region may be extracted from the captured image using a discriminator that has learned the features of the subject in advance by machine learning. In this case, the information indicating the results of the learning described above is stored in the storage unit 1020 in advance as "information required to extract the region of the subject from the captured image," and the extraction unit 1030 uses the discriminator specified by the information to extract the subject region from the captured image.

FIGS. 3A and 3B illustrate examples of the subject region extracted from the captured image. FIGS. 3A and 3B illustrate some image regions in the captured image, with each of the rectangles in the image regions indicating a pixel. Pixels marked with diagonal lines represent pixels constituting the subject region, and blank pixels represent pixels constituting an external region (non-subject region) of the subject region.

In step S2030, a region expansion unit 1040 performs extension processing for expanding (extending) the subject region extracted by the extraction unit 1030. Specifically, the region expansion unit 1040 determines whether, for each pixel constituting the non-subject region (non-subject region pixel), eight adjacent pixels adjacent to the non-subject region pixel include one or more pixels belonging to the subject region. In a case where the eight adjacent pixels adjacent to the non-subject region pixel include one or more pixels belonging to the subject region, the region expansion unit 1040 includes the non-subject region pixel in the subject region. On the other hand, in a case where the eight adjacent pixels adjacent to the non-subject region pixel include no pixel belonging to the subject region, the region expansion unit 1040 does not include the non-subject region pixel in the subject region.

Figure 4A:
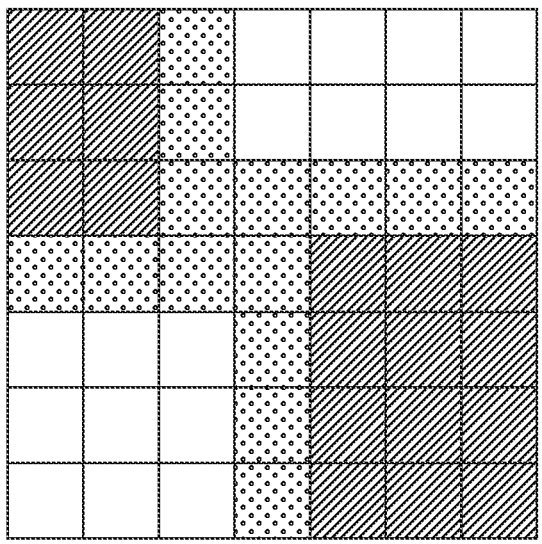
FIGS. 4A and 4B are diagrams illustrating results of extension processing performed on image regions illustrated in FIGS. 3A and 3B, respectively.
Figure 4B:
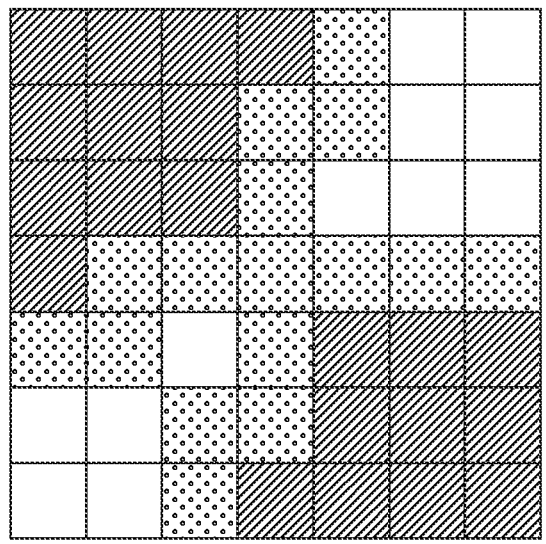

FIGS. 4A and 4B illustrate the results of the above-described extension processing performed on the image regions illustrated in FIGS. 3A and 3B, respectively. Pixels illustrated in a dot pattern in FIGS. 4A and 4B indicate pixels newly included in the subject region by the extension processing described above. Unless otherwise noted in the following description, "subject region" refers to a subject region that has been extended by the above-described extension processing. In the examples in FIGS. 4A and 4B, the subject region corresponds to a region including the pixels marked with diagonal lines (pixels constituting the subject region extracted by the extraction unit 1030) and the pixels illustrated in the dot pattern (pixels newly included in the subject region by the above-described extension processing). Note that various methods for extending the subject region are available and that the method is not limited to the one described above.

Figure 5:
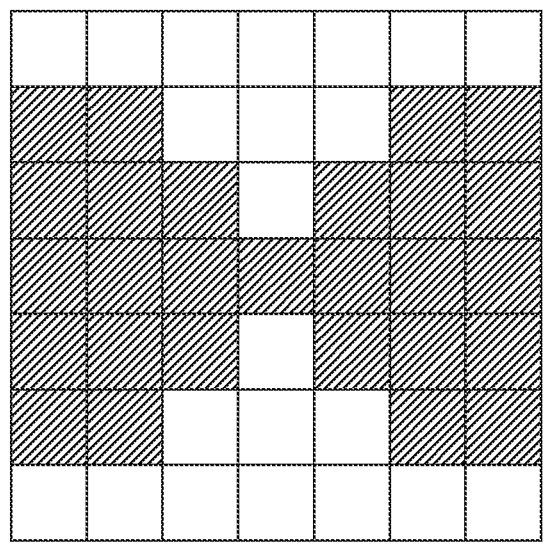
FIG. 5 is a diagram for describing a need for extension processing for eight neighbors.

Note that the extension processing for eight neighbors described above is processing required to calculate the direction vectors of all contour points regardless of the shape of the contour line in the next step S2040. For example, in a case of FIG. 5, a method in step S2040 described below cannot calculate the direction vector of the pixel at a center position, but the extension processing for eight neighbors allows the direction vector to be calculated.

Note that processing in steps S2030 to 2050 may be performed sequentially for each pixel or in parallel for each pixel. In the latter case, independent processing is performed on each pixel for the purpose of using a calculator such as GPGPU or an FPGA which includes a large number of calculation cores to simultaneously perform calculation on an enormous number of pixels in the captured image. A description will be provided below for calculation of the next contour point with one pixel in the captured image focused on.

In step S2040, the calculation unit 1050 sets, as a pixel of interest, a pixel in a boundary portion (contour line of the subject region) of the subject region bounding the non-subject region (region other than the subject region), and determines a direction vector (normal vector of the contour point) from the pixel of interest to the non-subject region.

Figure 6A:
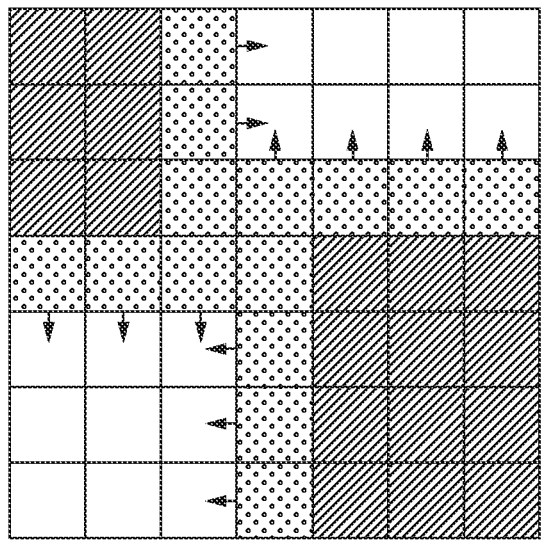
FIGS. 6A and 6B are diagrams illustrating direction vectors determined for subject regions in FIGS. 4A and 4B, respectively.
Figure 6B:
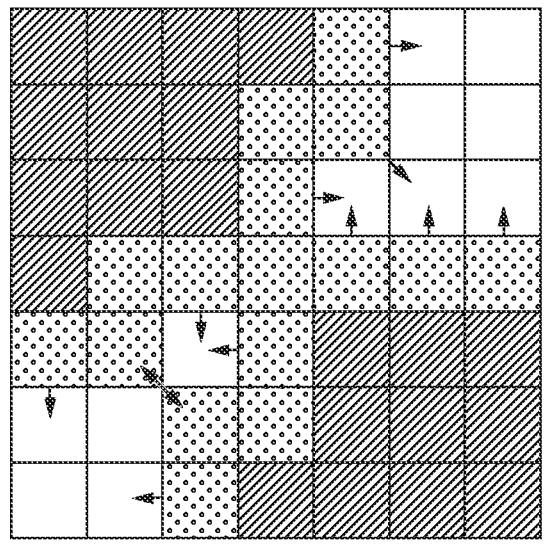

More specifically, the calculation unit 1050 determines no direction vector for the pixel of interest in a case where four pixels adjacent to the pixel of interest in the vertical direction and in the horizontal direction include no pixel belonging to the non-subject region (non-subject region pixel). Additionally, in a case where the four pixels adjacent to the pixel of interest in the vertical direction and in the horizontal direction include one pixel belonging to the non-subject region (non-subject region pixel), the calculation unit 1050 determines a direction vector from the pixel of interest to the non-subject region pixel. Additionally, in a case where the four pixels adjacent to the pixel of interest in the vertical direction and in the horizontal direction include a plurality of non-subject region pixels, the calculation unit 1050 determines, for each of the plurality of non-subject region pixels, a direction vector from the pixel of interest to the non-subject region pixel, and combines the determined direction vectors into a direction vector. In this way, the calculation unit 1050 determines a direction vector with non-subject region pixels around the pixel of interest taken into account. Note that the calculation unit 1050 normalizes the determined direction vector to a vector of a specified size (for example, a vector having a size of 1). FIGS. 6A and 6B illustrate the direction vectors determined for the subject regions in FIGS. 4A and 4B, respectively.

In step S2050, the calculation unit 1060 sets, as a pixel of interest (contour point), a pixel in the boundary portion of the subject region bounding the non-subject region, and selects, based on the direction vector of the pixel of interest, one of the pixels in the boundary portion adjacent to the pixel of interest as a selected pixel (next contour point corresponding to the contour point next to the above-described contour point). Then, the calculation unit 1060 generates information indicating the direction from the pixel of interest (contour point) to the selected pixel (contour point next to the above-described contour point) as information (contour information) indicating the contour of the subject region. Details of the processing in step S2050 will be described with reference to a flowchart in FIG. 7.

Figure 8A:
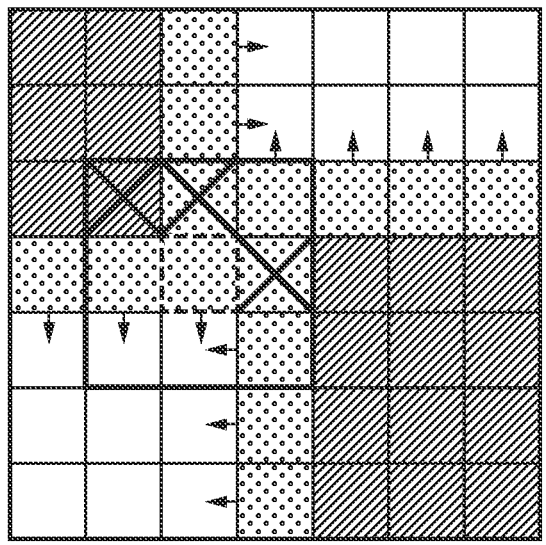
FIGS. 8A and 8B are diagrams illustrating results of processing in step S2110 performed on image regions in FIGS. 6A and 6B, respectively.
Figure 8B:
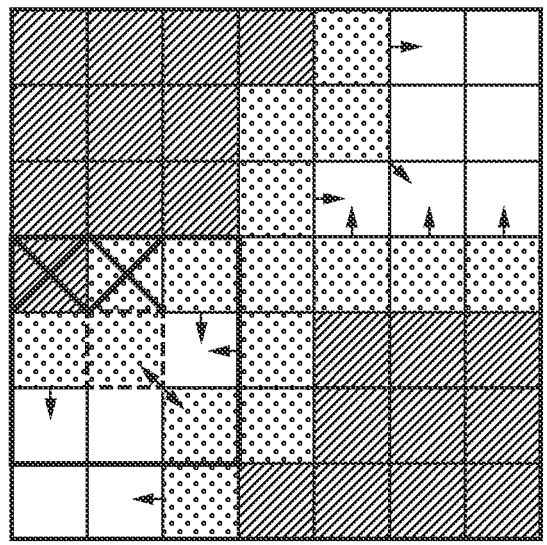

In step S2110, the calculation unit 1060 excludes, from the candidates for the next contour point, those of the eight adjacent pixels adjacent to the pixel of interest for which no direction vector has been determined. FIGS. 8A and 8B illustrate the results of the processing in step S2110 performed on the image regions in FIGS. 6A and 6B, respectively.

A rectangular pixel enclosed by dotted lines in FIG. 8A is a pixel of interest, and nine pixels enclosed by thick lines include the pixel of interest and eight adjacent pixels adjacent to the pixel of interest. Of the eight adjacent pixels, for the adjacent pixel located at the upper left of the pixel of interest, the adjacent pixel located above the pixel of interest, and the adjacent pixel located to the right of the pixel of interest, no direction vector is determined. Accordingly, the adjacent pixel located at the upper left of the pixel of interest, the adjacent pixel located above the pixel of interest, and the adjacent pixel located to the right of the pixel of interest are excluded from the candidates for the next contour point. In FIG. 8A, the adjacent pixel located at the upper left of the pixel of interest, the adjacent pixel located above the pixel of interest, and the adjacent pixel located to the right of the pixel of interest are labeled "×," and this means that the adjacent pixels are excluded from the candidates for the next contour point.

A rectangular pixel enclosed by dotted lines in FIG. 8B is a pixel of interest, and nine pixels enclosed by thick lines include the pixel of interest and eight adjacent pixels adjacent to the pixel of interest. Of the eight adjacent pixels, for the adjacent pixel located at the upper left of the pixel of interest and the adjacent pixel located above the pixel of interest, no direction vector is determined. Accordingly, the adjacent pixel located at the upper left of the pixel of interest and the adjacent pixel located above the pixel of interest are excluded from the candidates for the next contour point. In FIG. 8B, the adjacent pixel located at the upper left of the pixel of interest and the adjacent pixel located above the pixel of interest are labeled "×," and this means that the adjacent pixels are excluded from the candidates for the next contour point.

Figure 9A:
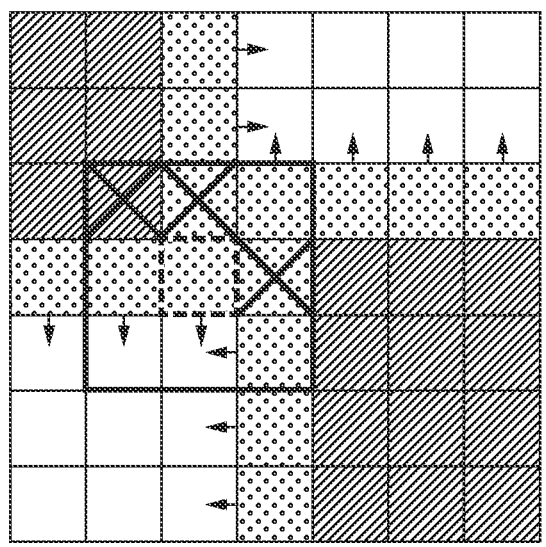
FIGS. 9A and 9B are diagrams illustrating results of processing in step S2120 performed on the image regions in FIGS. 8A and 8B, respectively.
Figure 9B:
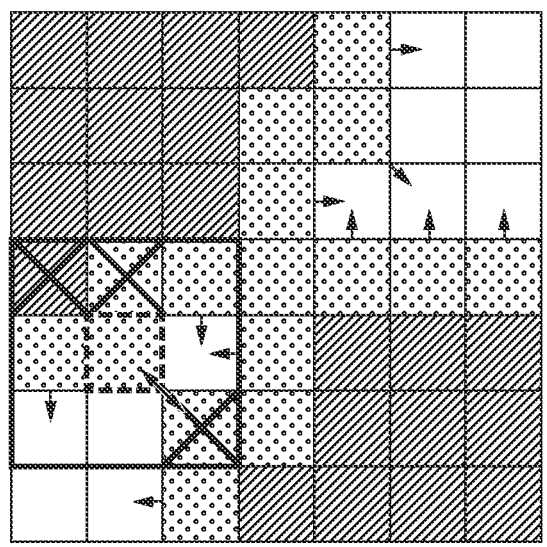

In step S2120, in a case where, of the eight adjacent pixels adjacent to the pixel of interest, the adjacent pixel located in the direction pointed by the direction vector of the pixel of interest is a subject region pixel, the calculation unit 1060 excludes the adjacent pixel from the candidates for the next contour point. FIGS. 9A and 9B illustrate the results of the processing in step S2120 performed on the image regions in FIGS. 8A and 8B, respectively.

A rectangular pixel enclosed by dotted lines in FIG. 9A is a pixel of interest, and nine pixels enclosed by thick lines include the pixel of interest and eight adjacent pixels adjacent to the pixel of interest. In FIG. 9A, of the eight adjacent pixels adjacent to the pixel of interest, the adjacent pixel located in the direction pointed by the direction vector of the pixel of interest is a non-subject region pixel instead of the subject region pixel, and is thus not to be processed in step S2120.

A rectangular pixel enclosed by dotted lines in FIG. 9B is a pixel of interest, and nine pixels enclosed by thick lines include the pixel of interest and eight adjacent pixels adjacent to the pixel of interest. In FIG. 9B, of the eight adjacent pixels adjacent to the pixel of interest, the adjacent pixel located in the direction pointed by the direction vector of the pixel of interest is labeled "×," and this means that the adjacent pixel is a subject region pixel and is thus excluded from the candidates for the next contour point. As illustrated in FIG. 9B, in a case where the direction vector points a diagonal direction, the direction vectors of the pixels point opposite directions. This indicates that this next contour point candidate is lower in continuity of the direction vectors between the pixels than the other next contour point candidates.

In step S2130, of the eight adjacent pixels adjacent to the pixel of interest, the calculation unit 1060 determines the adjacent pixels not excluded as candidates for the next contour point (in other words, the adjacent pixels are candidates for the next contour point) to be target pixels. Then, the calculation unit 1060 searches the eight adjacent pixels adjacent to the pixel of interest for the target pixels such that the search is sequentially performed counterclockwise starting with the pixel located in the direction of the direction vector of the pixel of interest, and the calculating unit 1060 selects, as a selected pixel, the target pixel found first. Then, the calculation unit 1060 generates information indicating the direction from the pixel of interest (contour point) to the selected pixel (contour point next to the above-described contour point) as information (contour information) indicating the contour of the subject region.

Figure 10A:
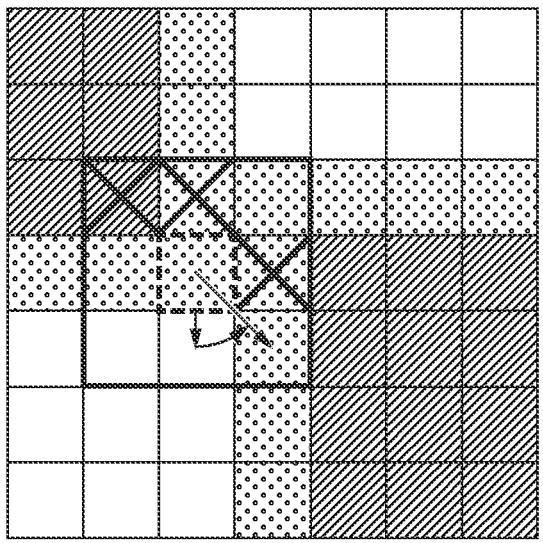
FIGS. 10A and 10B are diagrams illustrating results of processing in step S2130 performed on the image regions in FIGS. 9A and 9B, respectively.
Figure 10B:
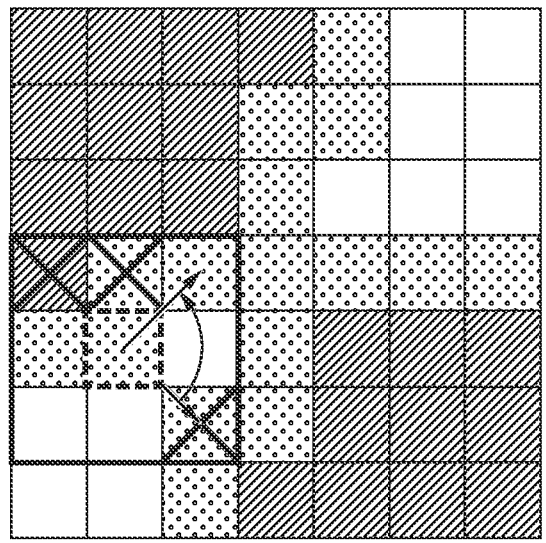

FIGS. 10A and 10B illustrate the results of the processing in step S2130 performed on the image regions in FIGS. 9A and 9B, respectively. A rectangular pixel enclosed by dotted lines in FIG. 10A is a pixel of interest, and nine pixels enclosed by thick lines include the pixel of interest and eight adjacent pixels adjacent to the pixel of interest. In FIG. 10A, those of the eight adjacent pixels adjacent to the pixel of interest which are not labeled "×" are determined to be target pixels. Then, the eight adjacent pixels adjacent to the pixel of interest are searched for the target pixels such that the search is sequentially performed counterclockwise starting with the pixel located in the direction of the direction vector of the pixel of interest, as illustrated by arrows, and the target pixel found first (adjacent pixel located at the lower right of the pixel of interest) is selected as a selected pixel. Then, information indicating the direction (indicated by an arrow in FIG. 10A) from the pixel of interest to the selected pixel is generated as information (contour information) indicating a contour of the subject region.

A rectangular pixel enclosed by dotted lines in FIG. 10B is a pixel of interest, and nine pixels enclosed by thick lines include the pixel of interest and eight adjacent pixels adjacent to the pixel of interest. In FIG. 10B, those of the eight adjacent pixels adjacent to the pixel of interest which are not labeled "×" are determined to be target pixels. Then, the eight adjacent pixels adjacent to the pixel of interest are searched for the target pixels such that the search is sequentially performed counterclockwise starting with the pixel located in the direction of the direction vector of the pixel of interest, as illustrated by arrows, and the target pixel found first (adjacent pixel located at the upper right of the pixel of interest) is selected as a selected pixel. Then, information indicating the direction (indicated by an arrow in FIG. 10B) from the pixel of interest to the selected pixel is generated as information (contour information) indicating a contour of the subject region.

Now, the processing in step S2130 described above will be described in further detail. In a case where a traveling vector is defined as a direction vector from the pixel of interest to the adjacent pixel used as a candidate for the next contour point, the selected pixel may be the adjacent pixel corresponding to a traveling vector for which the outer product between the traveling vector and the direction vector of the pixel of interest has a positive Z element and which involves the largest inner product between the traveling vector and the direction vector of the pixel of interest.

Assuming that the position of the pixel of interest is p and the position of an adjacent pixel used as a candidate for the next contour point is q, a traveling vector d from the pixel of interest to the adjacent pixel can be determined by calculating Equation (1) below.

[Equation 1]

[Equation 1]

$$d = \frac{q - p}{\|q - p\|} \quad (1)$$

Then, assuming that the direction vector $n=(n_x, n_y)$ and that the traveling vector $d=(d_x, d_y)$, the Z element $c_z$ of the outer product between the direction vector n and the traveling vector d can be determined by calculating Equation (2) below.

[Equation 2]

$$c_z = n_x d_y - n_y d_x \quad (2)$$

Finally, from the adjacent pixels for which the Z element $c_z$ of the outer product is positive, the inner product between the direction vector n and the traveling vector d is calculated, and the adjacent pixel corresponding to the traveling vector d with the largest inner product is selected as a selected pixel.

Figure 7:
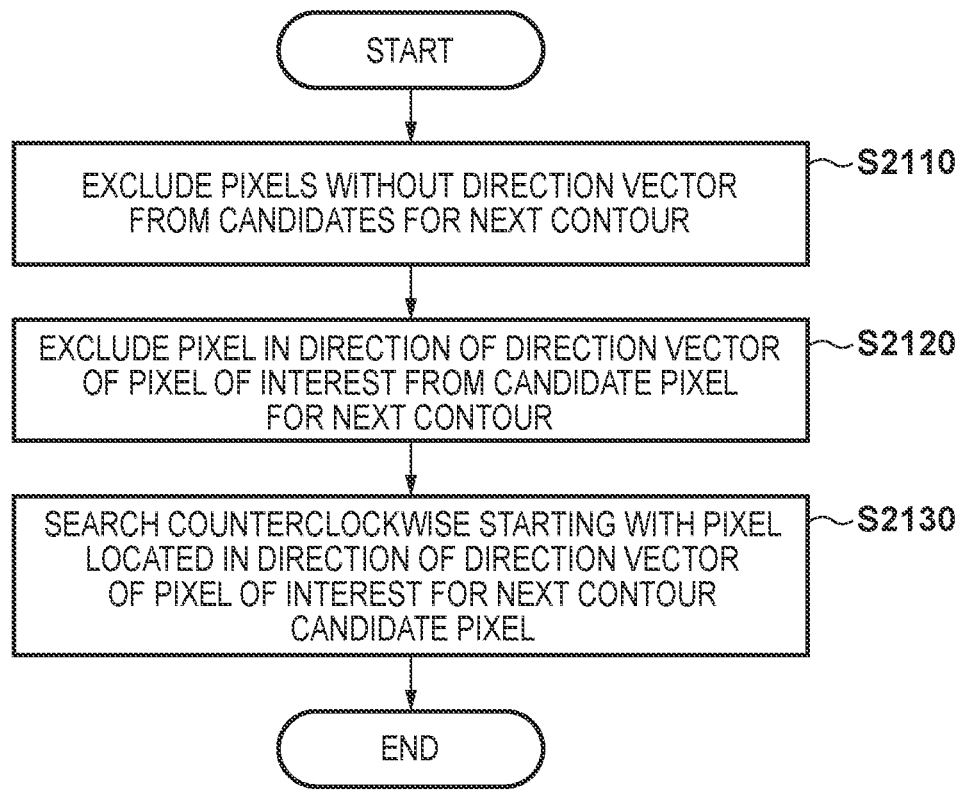
FIG. 7 is a flowchart illustrating details of processing in step S2050.
Figure 11A:
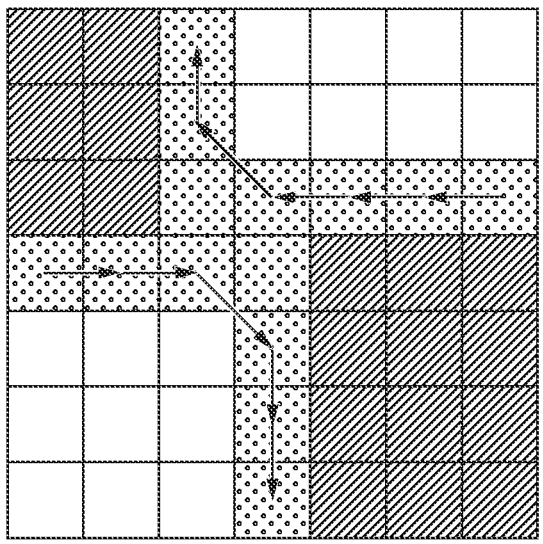
FIGS. 11A and 11B illustrate examples of contour information.
Figure 11B:
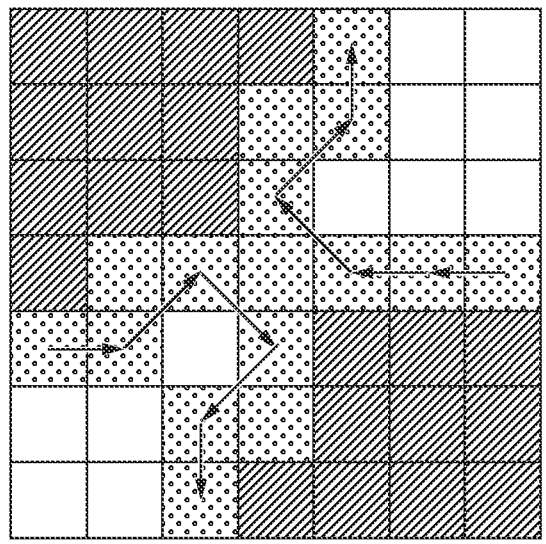

Processing in accordance with the flowchart in FIG. 7 is performed on each of the pixels in the boundary portion of the subject region of FIG. 4A bounding the non-subject region, to obtain contour information illustrated in FIG. 11A. The processing in accordance with the flowchart in FIG. 7 is performed on each of the pixels in the boundary portion of the subject region of FIG. 4B bounding the non-subject region, to obtain contour information illustrated in FIG. 11B. In FIGS. 11A and 11B, for each of the pixels in the boundary portion of the subject region bounding the non-subject region, information (arrow information) indicating the direction from the pixel to the next contour point is generated as contour information.

Figure 12B:
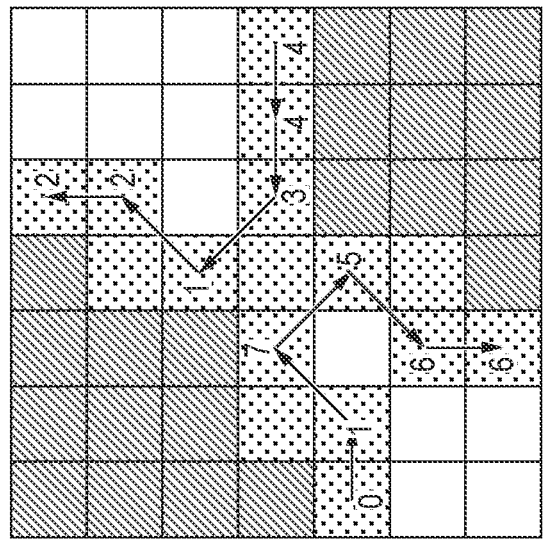
FIGS. 12A and 12B illustrate examples of contour information.
Figure 12A:
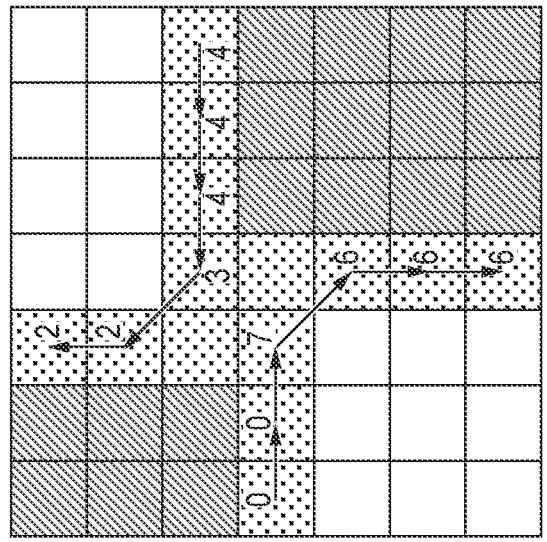

Note that, as illustrated in FIGS. 12A and 12B, indexes (numbers of 0 to 7) may be provided at the upper left of, above, at the upper right of, to the left of, to the right of, at the lower left of, below, and at the lower right of the pixel of interest. In this case, for each of the pixels in the boundary portion of the subject region bounding the non-subject region, as information indicating the direction from the pixel to the next contour point, the index corresponding to the direction is generated as contour information.

In this way, in the present embodiment, contour information can be generated independently for each pixel, and thus the generation of contour information can be performed in parallel for each pixel, and as a result, the speed of the processing for generating contour information in one frame of the captured image can be increased. This nevertheless enables a reduction in delay in the generation and display of a mixed reality space image for each frame.

Note that, in the present embodiment described above, the system is applied to MR but that the application is not limited to MR. In other words, the present embodiment can be applied to a technical field involving a need to perform contour tracking on a subject in a captured image at a higher speed.

Modification Example 1

In the first embodiment, in step S2130, the target pixels are searched for counterclockwise. However, the target pixels may be searched for clockwise. In this case, the direction from the pixel of interest to the selected pixel is opposite to the direction described in the first embodiment.

Modification Example 2

In the first embodiment, the extension processing is performed on the subject region to allow calculation of the direction vector of each pixel in the boundary portion. However, the extension processing displaces the contour of the subject region from the original contour, and thus another image processing involving reduction of the subject region or the like may be additionally performed before the extension processing. Performing the reduction processing on the subject region enables micro noise on the captured image to be removed and also allows suppression of displacement of the contour resulting from the extension processing.

Figure 13C:
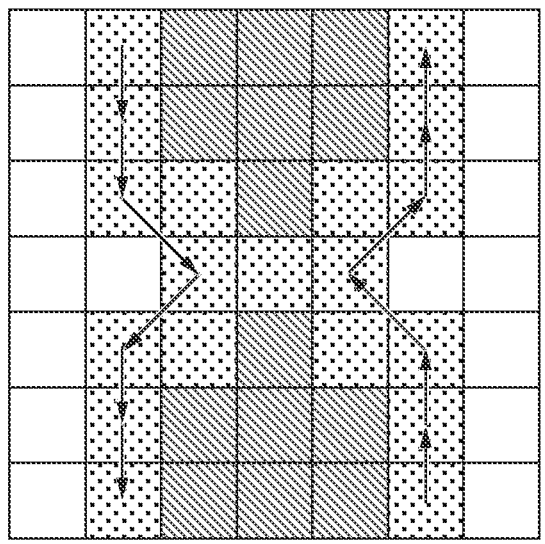
FIGS. 13A to 13C illustrate examples of results of contour tracking.
Figure 13B:
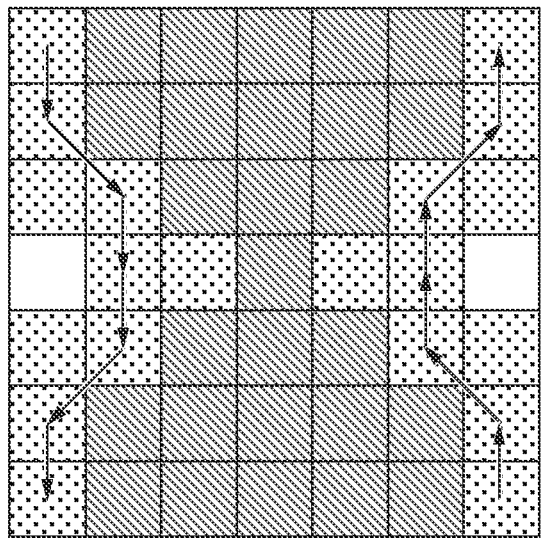
Figure 13A:
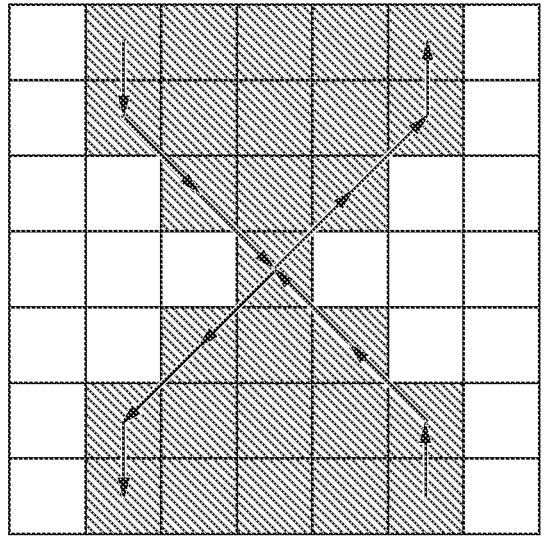

FIG. 13A illustrates the results of true contour tracking, FIG. 13B illustrates the results of contour tracking in a case where the extension processing is performed on the subject region with the reduction processing not performed on the subject region, and FIG. 13C illustrates the results of contour tracking in a case where the reduction processing is performed and then the extension processing is performed, on the subject region. The figures indicate that, when the reduction processing is performed and then the extension processing is performed, on the subject region, the results of contour tracking are similar to the true contour.

Modification Example 3

Figure 14A:
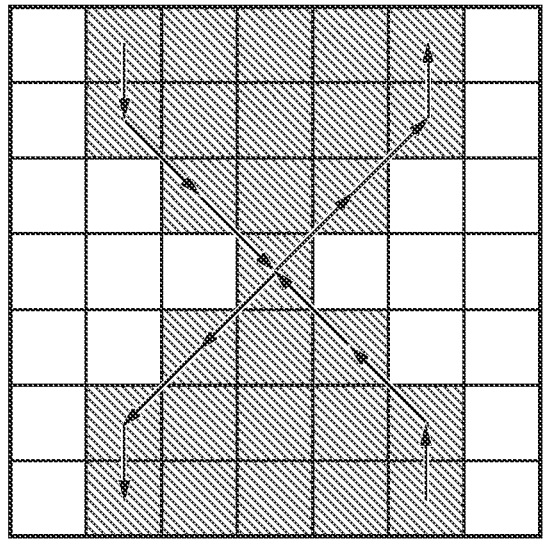
FIGS. 14A to 14C illustrate examples of results of contour tracking.
Figure 14B:
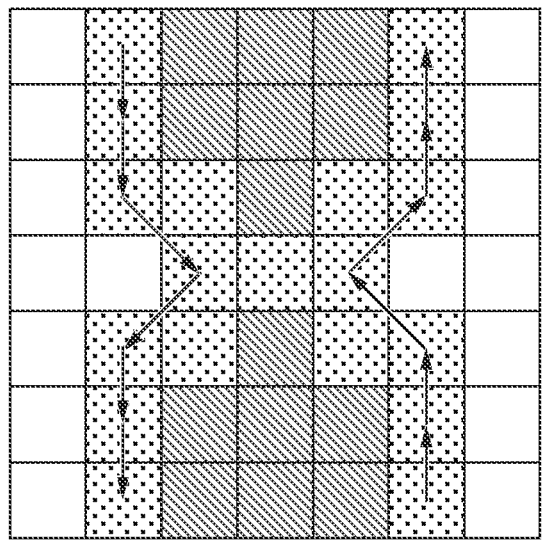
Figure 14C:
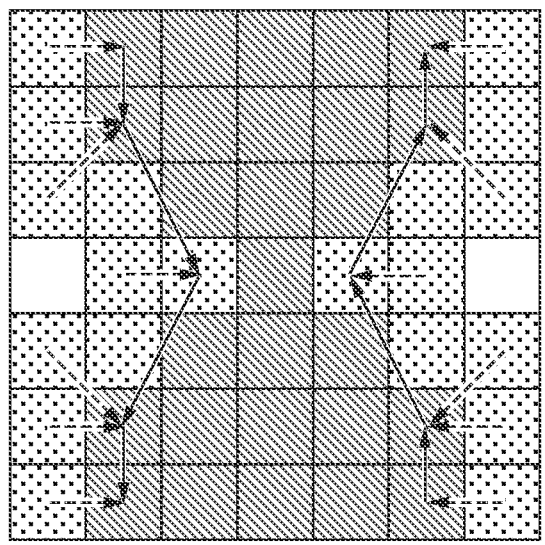

In Modification Example 2, for correction of the position of the contour, the extension processing is performed on the subject region after the reduction processing is performed on the subject region. However, the contour may be corrected with the reduction processing not performed, by moving, after contour extraction, the position of each contour point by a distance equal to the size of the direction vector of the contour point in a direction opposite to the direction vector. FIG. 14A illustrates the results of true contour tracking, and FIG. 14B illustrates the results of contour tracking in a case where the reduction processing is performed and then the extension processing is performed, on the subject region. Additionally, FIG. 14C illustrates the results of contour tracking in a case where, after contour extraction, the position of each contour point is moved by a distance equal to the size of the direction vector of the contour point in the direction opposite to the direction vector. Note that the dotted line portion in FIG. 14C indicates the correction directions for the positions of the contour points. FIG. 14C indicates that, also in Modification Example 3, results similar to those in Modification Example 2 are obtained.

In other words, in the configuration in which, for a pixel of interest in a boundary portion of a specific region in the captured image bounding a non-specific region, a direction vector to the non-specific region is determined, and in which, based on the direction vector of the pixel of interest, one of the pixels in the boundary portion adjacent to the pixel of interest is selected as a selected pixel, and in which information indicating the direction from the pixel of interest to the selected pixel is generated as information indicating a contour corresponding to the specific region, the "specific region" may be a "region resulting from extension of the region of the subject in the captured image" or a "region resulting from extension of the region of the subject in the captured image following reduction of the region of the subject" or may be a region determined by any other method.

Second Embodiment

The functional units of the image processing apparatus 1000 illustrated in FIG. 1 may be implemented in hardware, or the functional units other than the storage unit 1020 may be implemented in software (computer program). In the latter case, a computer apparatus that can execute the computer program can be applied to the image processing apparatus 1000. An example of a hardware configuration of the computer apparatus applicable to the image processing apparatus 1000 will be described using a block diagram in FIG. 15.

A CPU 1501 performs various steps of processing using computer programs and data stored in a RAM 1502 or a ROM 1503. Accordingly, the CPU 1501 controls the operation of the computer apparatus as a whole, and performs or controls each step of processing described above as being executed by the image processing apparatus 1000. Note that the computer apparatus may include, in addition to or in lieu of the CPU 1501, a large number of calculation cores such as GPGPU, FPGA, and the like, and some of the steps of processing in the computer apparatus may be performed by GPGPU, FPGA, or the like.

The RAM 1502 includes an area for storing computer programs and data loaded from the ROM 1503 or an external storage apparatus 1506, and an area for storing data externally received via an interface (I/F) 1507. The RAM 1502 further includes a work area used by the CPU 1501 in executing various steps of processing. In this way, the RAM 1502 can provide various areas as appropriate. The ROM 1503 stores setting data, start-up programs, or the like for the computer apparatus.

An operation unit 1504 is a user interface such as a keyboard, a mouse, a touch panel screen, or the like, which can be operated by the user to input various instructions to the CPU 1501.

A display unit 1505 includes a liquid crystal screen or a touch panel screen, and can display results of processing by the CPU 1501 using images, characters, or the like. Note that the display unit 1505 may be a projection apparatus such as a projector that projects images or characters.

The external storage apparatus 1506 is an example of a large capacity information storage apparatus. The external storage apparatus 1506 stores an operating system (OS), computer programs for causing the CPU 1501 to execute and control the various steps of processing described above as being performed by the image processing apparatus 1000, and data. The computer programs stored in the external storage apparatus 1506 include computer programs for causing the CPU 1501 to execute and control the functions of the functional units of the image processing apparatus 1000 in FIG. 1 other than the storage unit 1020. Additionally, the data stored in the external storage apparatus 1506 includes information described above as known information.

The computer programs and data stored in the external storage apparatus 1506 are loaded into the RAM 1502 as appropriate under the control of the CPU 1501, and are then to be processed by the CPU 1501. Note that the storage unit 1020 of the image processing apparatus 1000 in FIG. 1 can be implemented by the RAM 1502 or the external storage apparatus 1506.

The I/F 1507 functions as a communication interface via which the computer apparatus performs data communication with an external apparatus, and for example, the image capturing apparatus 100 and the display apparatus 200 in FIG. 1 are connected to the I/F 1507.

Figure 15:
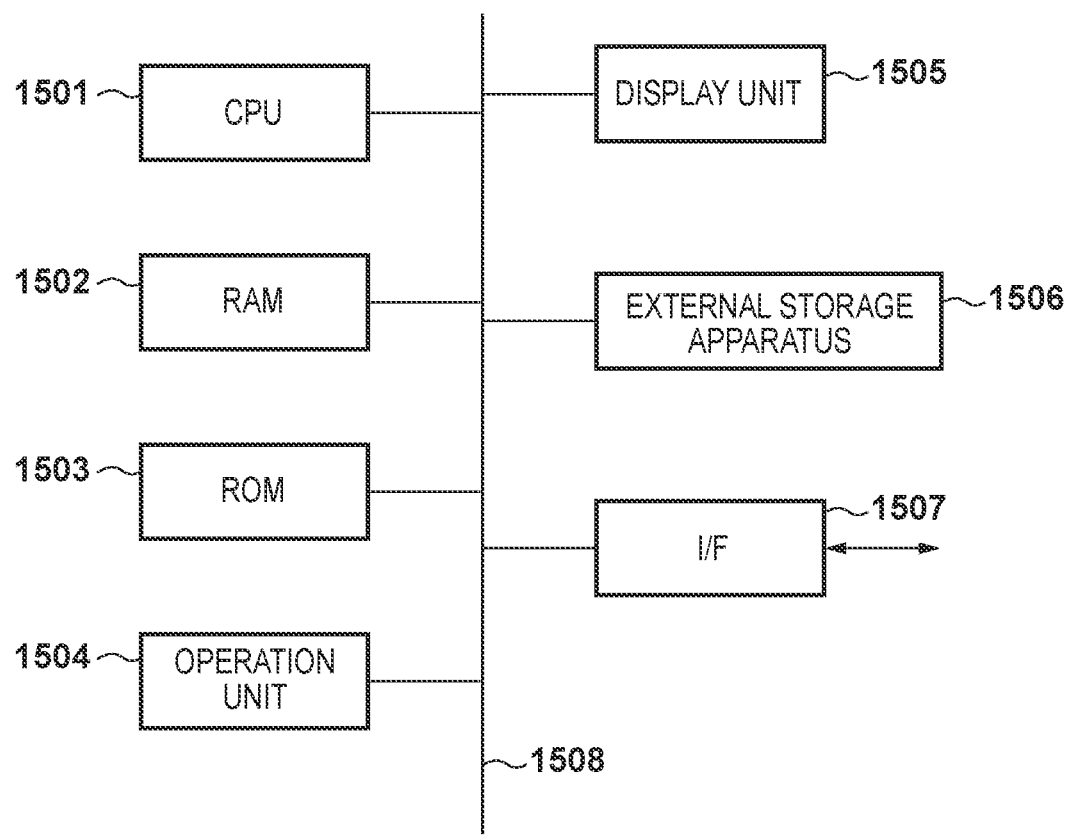
FIG. 15 is a block diagram illustrating an example of a hardware configuration of a computer apparatus applicable to an image processing apparatus 1000.

The CPU 1501, the RAM 1502, the ROM 1503, the operation unit 1504, the display apparatus 1505, the external storage apparatus 1506, and the I/F 1507 are all connected to a bus 1508. Note that the configuration illustrated in FIG. 15 is an example of the hardware configuration of the computer apparatus that can be applied to the image processing apparatus 1000 and that the configuration can be varied/changed as appropriate.

Note that the specific numerical values used in the above description are used to provide specific descriptions and that the embodiments and the modification examples described above are not intended to be limited to the numerical values. Additionally, some or all of the embodiments and modification examples described above may be used in combination as appropriate. In addition, some or all of the embodiments and modification examples described above may be used in a selective manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140124, filed Jul. 30, 2019, which is hereby incorporated by reference herein in its entirety.

What is claimed is:

1. An image processing apparatus that processes a captured image including a first region of pixels, a second region of pixels disposed outside the first region of pixels, and a third region of pixels separating the first region of pixels from the second region of pixels, the image processing apparatus comprising:
   a memory and at least one processor and/or at least one circuit configured to implement:
   a calculation unit configured to obtain, for a pixel of interest in the third region of pixels, which separates the first region of pixels from the second region of pixels, in the captured image, a direction vector to the second region of pixels;
   a selection unit configured to select one of pixels in the third region of pixels that are adjacent to the pixel of interest, as a selected pixel based on the direction vector of the pixel of interest; and
   a generation unit configured to generate information indicating a direction from the pixel of interest to the selected pixel as information indicating a contour corresponding to the first region of pixels, wherein
   in a case where a plurality of pixels among four pixels adjacent to the pixel of interest in a vertical direction and in a horizontal direction belong to the second region of pixels, the calculation unit is configured to obtain respective direction vectors from the pixel of interest to each of the plurality of pixels and combine the obtained direction vectors into one direction vector.

2. The image processing apparatus according to claim 1, wherein
   in a case where one pixel among four pixels adjacent to the pixel of interest in a vertical direction and in a horizontal direction belongs to the second region of pixels, the calculation unit is configured to obtain a direction vector from the pixel of interest to the one pixel.

3. The image processing apparatus according to claim 1, wherein
   the selection unit is configured to select the selected pixel from among eight pixels adjacent to the pixel of interest, the selected pixel being included in the third region of pixels.

4. The image processing apparatus according to claim 1, wherein
   processing by the calculation unit, the selection unit, and the generation unit is performed independently and in parallel for each pixel of interest.

5. The image processing apparatus according to claim 1, wherein the memory and the at least one processor and/or the at least one circuit are further configured to implement:
   an extraction unit configured to extract the first region of pixels from the captured image; and
   an extension unit configured to extend the first region of pixels,
   wherein
   the third region of pixels is a region resulting from extension of the first region of pixels in the captured image.

6. The image processing apparatus according to claim 5, wherein
   the first region of pixels corresponds to a region of a subject in the captured image.

7. The image processing apparatus according to claim 5, wherein in a case where there is a pixel belonging to the first region of pixels among pixels adjacent to a non-subject region pixel included in a region outside the first region of pixels, the extension unit is configured to include the non-subject region pixel in the third region of pixels.

8. The image processing apparatus according to claim 1, wherein the memory and the at least one processor and/or the at least one circuit are further configured to implement:

an image generation unit configured to determine a depth value of the contour based on information indicating the contour to generate an image of a virtual space based on the depth value.

9. The image processing apparatus according to claim 8, wherein the memory and the at least one processor and/or the at least one circuit are further configured to implement:

an output unit configured to generate and output a composite image of the image of the virtual space and the captured image.

10. The image processing apparatus according to claim 9, wherein the output unit is configured to output the composite image to an apparatus including an image capturing apparatus configured to capture the captured image and a display apparatus configured to display the composite image.

11. The image processing apparatus according to claim 10, wherein the apparatus including the image capturing apparatus and the display apparatus is a head-mounted display.

12. The image processing apparatus according to claim 8, wherein the generation unit is configured to generate, as the information indicating the contour, a chain code image in which information indicating a position of a next contour point for each contour point is registered.

13. The image processing apparatus according to claim 12, wherein the image generation unit is configured to estimate the depth value by using the chain code image.

14. The image processing apparatus according to claim 12, wherein the image generation unit is configured to generate, based on the depth value and a parameter of an image capturing apparatus which has captured the captured image, a polygon corresponding to a region which is surrounded by a contour indicated by the contour information.

15. An image processing apparatus that processes a captured image including a first region of pixels, a second region of pixels disposed outside the first region of pixels, and a third region of pixels separating the first region of pixels from the second region of pixels, the image processing apparatus comprising:

a memory and at least one processor and/or at least one circuit configured to implement:

a calculation unit configured to obtain, for a pixel of interest in the third region of pixels, which separates the first region of pixels from the second region of pixels, in the captured image, a direction vector to the second region of pixels;

a selection unit configured to select one of pixels in the third region of pixels that are adjacent to the pixel of interest, as a selected pixel based on the direction vector of the pixel of interest; and a generation unit configured to generate information indicating a direction from the pixel of interest to the selected pixel as information indicating a contour corresponding to the first region of pixels, wherein the selection unit is configured to select the selected pixel from among eight pixels adjacent to the pixel of interest, the selected pixel being included in the third region of pixels;

the calculation unit determines no direction vector for a pixel in the third region of pixels in a case where none of four pixels that are adjacent to the pixel in the third region of pixels in a vertical direction and in a horizontal direction are included in the second region of pixels; and the selection unit is configured to select the selected pixel from pixels obtained by excluding, from among the eight pixels adjacent to the pixel of interest, a pixel for which no direction vector is determined.

16. The image processing apparatus according to claim 15, wherein the selection unit is configured to select the selected pixel from pixels obtained by excluding, from among the eight pixels adjacent to the pixel of interest, the pixel for which no direction vector is determined and a pixel located in a direction of the direction vector of the pixel of interest.

17. The image processing apparatus according to claim 16, wherein the selection unit is configured to determine pixels obtained by excluding, from the eight pixels adjacent to the pixel of interest, the pixel for which no direction vector is determined and the pixel located in the direction of the direction vector of the pixel of interest, to be target pixels, and the selection unit is configured to sequentially search the eight pixels in a clockwise or counterclockwise manner starting with the pixel located in the direction of the direction vector of the pixel of interest, and select, as the selected pixel, a target pixel found first.

18. An image processing method for an image processing apparatus that processes a captured image including a first region of pixels, a second region of pixels disposed outside the first region of pixels, and a third region of pixels separating the first region of pixels from the second region of pixels, the image processing method comprising:

obtaining, for a pixel of interest in the third region of pixels, which separates the first region of pixels from the second region of pixels, in the captured image, a direction vector to the second region of pixels;

selecting one of pixels in the third region of pixels that are adjacent to the pixel of interest, as a selected pixel based on the direction vector of the pixel of interest; and generating information indicating a direction from the pixel of interest to the selected pixel as information indicating a contour corresponding to the first region of pixels, wherein in a case where a plurality of pixels among four pixels adjacent to the pixel of interest in a vertical direction and in a horizontal direction belong to the second region of pixels, respective direction vectors from the pixel of interest to each of the plurality of pixels are obtained, and the obtained direction vectors are combined into one direction vector.

19. A non-transitory computer-readable storage medium storing a computer program for causing a computer, which processes a captured image including a first region of pixels, a second region of pixels disposed outside the first region of pixels, and a third region of pixels separating the first region of pixels from the second region of pixels, to function as:
- a calculation unit configured to obtain, for a pixel of interest in the third region of pixels, which separates the first region of pixels from the second region of pixels, in the captured image, a direction vector to the second region of pixels;
- a selection unit configured to select one of pixels in the third region of pixels that are adjacent to the pixel of interest, as a selected pixel based on the direction vector of the pixel of interest; and
- a generation unit configured to generate information indicating a direction from the pixel of interest to the selected pixel as information indicating a contour corresponding to the first region of pixels, wherein
- in a case where a plurality of pixels among four pixels adjacent to the pixel of interest in a vertical direction and in a horizontal direction belong to the second region of pixels, the calculation unit is configured to obtain respective direction vectors from the pixel of interest to each of the plurality of pixels and combine the obtained direction vectors into one direction vector.

\* \* \* \* \*